United States Patent [19]

Zang et al.

[11] Patent Number: 5,634,724
[45] Date of Patent: Jun. 3, 1997

[54] HYDRODYNAMIC BEARING FOR SPINDLE MOTOR HAVING HIGH INERTIAL LOAD

[75] Inventors: Yan Zang, Milpitas; Michael R. Hatch, Mountain View, both of Calif.

[73] Assignee: Quantum Corporation, Milpitas, Calif.

[21] Appl. No.: 519,842

[22] Filed: Aug. 25, 1995

[51] Int. Cl.⁶ ................................................. F16C 17/10
[52] U.S. Cl. ........................................ 384/107; 384/124
[58] Field of Search .................................... 384/107, 112, 384/119, 124, 115, 123

[56] References Cited

U.S. PATENT DOCUMENTS

| | | | |
|---|---|---|---|
| 4,254,961 | 3/1981 | Fersht et al. | 277/80 |
| 4,795,275 | 1/1989 | Titcomb et al. | 384/107 |
| 5,067,528 | 11/1991 | Titcomb et al. | 141/4 |
| 5,112,142 | 5/1992 | Titcomb et al. | 384/107 |
| 5,161,900 | 11/1992 | Bougathou et al. | 384/133 |
| 5,246,294 | 9/1993 | Pan | 384/119 |
| 5,423,612 | 6/1995 | Zang et al. | 384/119 |
| 5,427,456 | 6/1995 | Hensel | 384/112 |
| 5,448,120 | 9/1995 | Schaule et al. | 310/90 |
| 5,533,811 | 7/1996 | Polch et al. | 384/107 |
| 5,558,443 | 9/1996 | Zang | 384/112 |
| 5,558,445 | 9/1996 | Chen et al. | 384/132 |

*Primary Examiner*—Lenard A. Footland
*Attorney, Agent, or Firm*—David B. Harrison

[57] ABSTRACT

A self-contained hydrodynamic bearing unit includes a shaft having a threaded axial opening at one end thereof and a shaft shoulder adjacent the opening and perpendicular with a longitudinal axis of the shaft, a sleeve defining an opening for receiving the shaft for relative rotation, a pair of longitudinally spaced-apart radial hydrodynamic journal bearings defined between the shaft and the sleeve, a shaft-bolt including a threaded end region for mating with the threaded axial opening of the shaft and defining a bolt shoulder, an annular thrust plate having two parallel radial faces and adapted to fit upon the shaft-bolt for mounting between the shaft shoulder and the shaft bolt shoulder when the shaft-bolt is mated with the threaded axial opening of the shaft, the sleeve defining a radial thrust bearing surface portion extending radially outwardly at one end and positioned to confront one radial face of the thrust plate, an annular thrust bushing mounted to the sleeve and defining a radial thrust bearing surface portion confronting the other radial face of the thrust plate, the annular thrust plate defining two axial hydrodynamic thrust bearings respectively with the radial thrust bearing surface portion of the sleeve and the radial thrust bearing surface portion of the annular thrust bushing and a hydrodynamic thrust bearing lubricant reservoir between the two axial hydrodynamic thrust bearings and between a cylindrical face of the thrust plate and a facing cylindrical wall of the sleeve, and a hydrodynamic bearing lubricant in the bearing unit and at the pair of hydrodynamic journal bearings and at the two axial hydrodynamic thrust bearings and in the hydrodynamic bearing lubricant reservoir.

30 Claims, 5 Drawing Sheets

HYDRODYNAMIC BEARING FOR SPINDLE MOTOR HAVING HIGH INERTIAL LOAD

FIELD OF THE INVENTION

The present invention relates to fluid bearings. More particularly, the present invention relates to a self-contained hydrodynamic bearing unit for a spindle motor having a high inertial load and which includes a plurality of lubricating liquid seals for preventing escape of lubricating liquid.

BACKGROUND OF THE INVENTION

The development of computer hard disk drives demands ever increasingly higher track density, lower acoustic noise, and better reliability under shock and vibrational disturbances. The undesirable characteristics of the currently used ball bearing spindles, such as high non-repetitive runout, large acoustic noise, and high resonance frequencies due to bearing defect, impose severe limitation on the drive's capacity and performance.

The use of a non-contact bearing, such as a hydrodynamic bearing ("HDB"), may overcome the aforementioned limitation. The full film lubrication of a fluid bearing displays significantly lower non-repetitive runout and acoustic noise, and its higher damping provides better resistance to external shock and vibration. One example of a disk drive spindle motor including a HDB and centrifugal-capillary seals is found in the present inventors' (with another co-inventor) U.S. Pat. No. 5,423,612 entitled: "Hydrodynamic Bearing and Seal", the disclosure thereof being incorporated herein by reference.

The deployment of the HDB system in a hard disk drive environment requires that the lubricant be securely sealed inside of the bearing structure under all operating and non-operating conditions in order to prevent performance degradation of the bearing and contamination in the drive. At the same time, the bearing system needs to be easily manufacturable in order to satisfy cost requirements. As explained below these requirements often come into conflict with each other and have heretofore resulted in compromised HDB spindle designs.

There have been a number of prior approaches for providing seals for hydrodynamic bearing units. Static seals, such as O-rings, and dynamic clearance seals, such as surface tension or capillary seals, have been employed to seal hydrodynamic bearings.

One prior example is found in Hendler et al. U.S. Pat. No. 3,778,123 entitled: "Liquid Bearing Unit and Seal". In the Hendler et al. approach, a non-wettable liquid, such as mercury, is placed in an annular Vee-groove at an outside boundary of the hydrodynamic bearing system. In addition, a thin film of low vapor pressure vacuum pump oil is provided at an annular gap or space at the end of a journal member in order to retain the mercury seal. A pair of thin barrier films are also provided at the outer edge of the annular space to prevent the oil from spreading as a result of surface effects and/or centrifugal forces generated by relative rotation of the bearing system.

Another prior approach is found in Van Roemburg U.S. Pat. No. 4,596,474, entitled: "Bearing System Comprising Two Facing Hydrodynamic Bearings". In the Van Roemburg approach, two radial fluid bearings were separated by a central reservoir. Each bearing included a herringbone pattern, and the herringbone patterns were such that the outer legs of the Vee-grooves forming the herringbone pattern were longer than the inner legs. However, the system maintained balanced pressure. This arrangement built up a lubricating liquid pressure at the apex of each Vee-groove which was greater than a counter pressure built up by the inner legs and by helical feed grooves which feed lubricant from a central reservoir area. By providing this differential pressure arrangement it is said that the lubricant was not pumped out of the bearing system.

A further prior approach is described in Anderson et al. U.S. Pat. No. 4,726,693, entitled: "Precision Hydrodynamic Bearing". The Anderson et al. approach uses a plurality of seals formed along the bearing unit including spiral grooves as well as an upper surface tension or capillary seal and a lower surface tension or capillary seal. However, the very nature of the Anderson et al. approach suggested that it was not adapted to omnidirectional operation or resistance to shock or vibratory forces.

Another prior approach is described in Titcomb et al. U.S. Pat. No. 4,795,275 and divisional patents U.S. Pat. Nos. 5,067,528 and 5,112,142, entitled: "Hydrodynamic Bearing". In the prior approaches described in these patents, surface tension dynamic seals were provided between axially extending surfaces of a thrust plate and bearing sleeve (or between tapered bearing surfaces). Pressure equalization ports were required and extended between the dynamic seals and interior lubricant reservoirs (or interior dynamic seals) to balance the hydrodynamic pressures in the lubricant in order to prevent the lubricant from being pumped through one of the dynamic seals. A method for introducing lubricating liquid into the hydrodynamic bearing employing a vacuum chamber and ultrasound is also described.

A similar prior approach is described in Pan U.S. Pat. No. 5,246,294 entitled: "Flow-Regulating Hydrodynamic Bearing". In this approach a disk spindle employs oppositely facing conical hydrodynamic bearing surfaces and a series of chambers and passages and a gravitational valve are provided to permit pressure-equalized centrifugally pumped global circulation of lubricating liquid drawn from one or more large reservoir volumes. A leak-preventing capillary trap "of minimum continuous axial length" may be provided at a clearance seal for passive capture of wandering lubricant when the bearing unit is at rest.

A further solution has been proposed by the present inventors with another in U.S. Pat. No. 5,423,612 entitled: "Hydrodynamic Bearing and Seal", the disclosure thereof being incorporated herein by reference. One drawback of the approach described in the '612 patent is it has proven somewhat difficult to provide recirculation ports around the bearings in order to realize a lubricant recirculation capability in circumstances such as imbalanced pumping and/or shock load. Another drawback was that since both top and bottom seals are at the inside diameter of the HDB unit, any splashed droplets which separate from the lubricant surface may be driven out of the bearing by centrifugal force. In addition, because of the small seal volume available at the HDB unit inside diameter, the lubricant may leak out of the bearing on account of thermal expansion and/or filling volume variations. A further drawback was that press fitting the thrust plate onto the shaft may cause excessive deformation resulting in large variations in bearing clearances and unacceptable hydrodynamic operation.

Small (3.5 inch disk diameter and smaller) form factor disk drives are used in unlimited applications and orientations. Consequently, a hydrodynamic bearing system for a disk spindle in such drives, e.g. having a full Z-dimension 1.6 inch height spindle manifesting high inertial loading, must also operate in all possible orientations, and to be able to withstand and sustain certain shock events and vibration levels without leakage. A cover-secured or top-fixed HDB motor is required for disk drives with high inertial load, such as disk drives including six or more rotating disks. For top-fixed spindles, the requirement for two lubricant seals poses a considerable challenge.

Generally, there are two types of top-fixed HDB spindle designs, namely: single thrust-plate design, as illustrated in commonly assigned U.S. Pat. No. 5,423,612; and, double thrust-plate design, as illustrated in FIG. 1.

The single thrust-plate design of the type illustrated in U.S. Pat. No. 5,423,612 has the several drawbacks already noted above.

Figure 1:
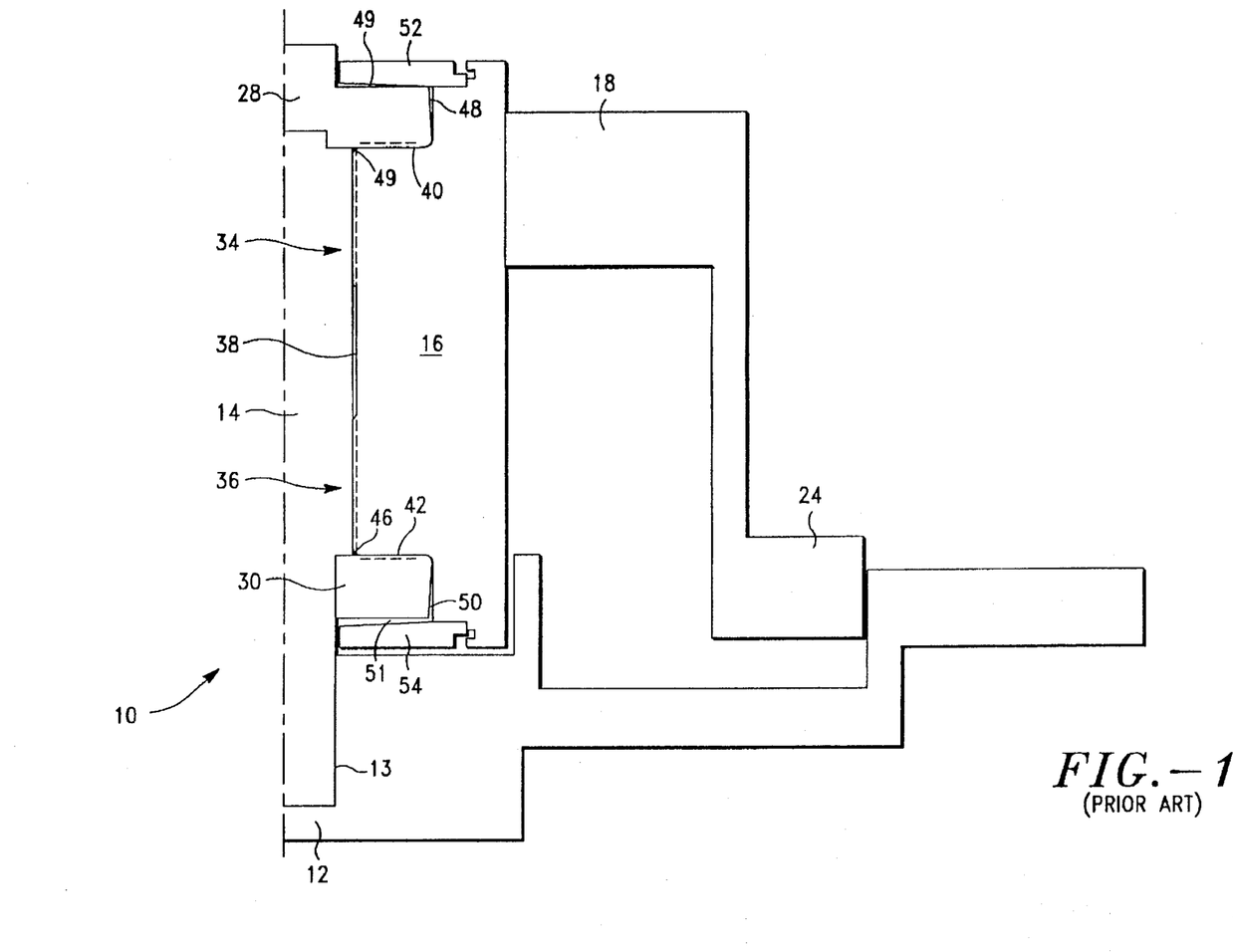
FIG. 1 is an enlarged diagrammatic view in section and elevation of a right one half side of a prior self contained hydrodynamic bearing unit and seals within a disk drive spindle.

The double thrust-plate design is shown in FIG. 1, and it overcomes the first and second drawbacks of the conventional single thrust plate designs noted above, while the third drawback remains present. Unfortunately, there are some additional drawbacks. As shown in FIG. 1 a prior double thrust-plate hydrodynamic spindle bearing system 10 for a high performance miniature hard disk drive includes a base 12 and a shaft 14 fixed securely to the base 12 in a suitably sized opening 13 defined in the base 12. A shaft housing 16 fits closely over the shaft 14 and cooperatively defines two hydrodynamic journal bearings 34 and 36. A spindle hub 18 is attached to the shaft housing 16 and a flange 24 of hub 18 supports one or more data storage disks 20 (and spacers 22) in a top-fixed arrangement(see e.g. FIG. 2). An in-hub spindle motor rotates the hub 18 and disks 20 relative to the base 12 and shaft 14 at a predetermined angular velocity.

An upper annular thrust bearing plate 28 fits securely over the shaft 14, while a lower annular thrust bearing ring 30 also fits securely over the shaft 14. Together, the plate 28 and ring 30 cooperate with adjacently facing radial faces of the shaft housing 16 to provide an upper hydrodynamic axial thrust bearing 40 and a lower hydrodynamic axial thrust bearing 42. A central axial reservoir region 38 is provided for lubricating liquid between the two radial hydrodynamic bearings 34 and 36. Two end reservoirs 44 and 46 are formed respectively between the bearings 34 and 40, and the bearings 36 and 42.

Two surface tension annular capillary seals 48 and 50 are provided in annular gaps outwardly beyond the two thrust bearings 40 and 42 relative to the shaft 14. The upper seal 48 is formed by outwardly axially divergent, oppositely facing cylindrical walls of the thrust plate 28 and shaft housing 16, and the lower seal 50 is formed by outwardly axially divergent, oppositely facing cylindrical walls of the thrust ring 30 and the shaft housing 16. In these seals 48 and 50, a curved lubricant-air interface typical of a surface tension interface is located approximately midway of the gap.

Two oil containment bushings 52 and 54 are secured in a sealed arrangement to the shaft housing 16 as shown in FIG. 1. The seal 48 is shown as having a radially inward extension 49, which effectively extends the upper capillary seal. The lower capillary seal 50 is likewise extended radially inwardly by an extension 51. Further details of this prior arrangement are disclosed in commonly assigned, copending U.S. patent application Ser. No. 08/363,566 filed on Dec. 22, 1994, entitled: "A Self-Contained Hydrodynamic Bearing Unit" now U.S. Pat. No. 5,558,445, the disclosure thereof being incorporated herein by reference.

As noted above, there are several additional drawbacks with the double thrust-plate design illustrated in FIG. 1. One additional drawback is controlling the tolerance of the total length of the sleeve which defines the thrust bearing clearance (which is about 10 microns). A second drawback relates to manufacturing difficulty in controlling the tolerances of perpendicularity and surface finish at both ends of the e.g. bronze sleeve. Third, because the sleeve is typically of bronze, the sleeve tends to wear by coming into contact with the grooved steel thrust plate having pumping grooves during starting and stopping intervals. Fourth, it has proven difficult to apply adhesive to seal the thrust plate/shaft press-fit areas of the bearing unit. Adhesive grooves at the side of the bottom thrust plate cause a lack of symmetry in the thrust plate and additional deformation during press fitting of the thrust plate and shaft.

Thus, a hitherto unsolved need has remained for a hydrodynamic bearing system having a high inertial load which is leak free irrespective of orientation, shock and vibration, and which is readily and reliably manufacturable at reasonably low manufacturing cost.

SUMMARY OF THE INVENTION WITH OBJECTS

A general object of the present invention is to provide a self-contained hydrodynamic bearing system for a spindle manifesting high inertial loading which overcomes limitations and drawbacks of the prior art.

Another object of the present invention is to provide a hydrodynamic bearing system which minimizes the risk of lubricating liquid leakage under all required operating conditions e.g. for disk drive spindle applications.

Yet another object of the present invention is to provide a hydrodynamic bearing system which combines improved capillary seals while providing for internal lubricating liquid recirculation.

One more object of the present invention is to provide a self-contained hydrodynamic bearing system for a spindle manifesting high inertial loading which is readily manufacturable at low cost.

Another object of the present invention is to provide a simplified hydrodynamic bearing system which includes upper and lower capillary seals for trapping and containing lubricating liquid at annular seal locations axially outside of journal bearing locations, and radially outward of a shaft-sleeve diameter of the system, an arrangement for returning liquid trapped at the secondary seal to the primary seal, and an arrangement for recirculating lubricating liquid between upper and lower seals.

A further object of the present invention is to provide a hydrodynamic bearing design for a disk drive spindle assembly which virtually eliminates lubricating liquid leakage thereby to improve substantially the useful life of the bearing and disk drive.

One more object of the present invention is to provide a hydrodynamic bearing assembly for a disk drive spindle and including both radial hydrodynamic bearings and axial thrust hydrodynamic bearings and a plurality of seals in an arrangement facilitating manufacture and assembly and leading to virtual leak-free operation, even when subjected to shock or vibration energy.

Still one more object of the present invention is to provide a simplified hydrodynamic bearing design which is simpler to manufacture, which operates reliably in any angular orientation, and which achieves superior bearing longevity over prior art fluid bearing designs.

In accordance with principles of the present invention, a self-contained hydrodynamic bearing unit comprises a shaft defining a threaded axial opening at one end thereof and a shaft shoulder adjacent the opening and perpendicular with a longitudinal axis of the shaft, a sleeve defining an opening for receiving the shaft for relative rotation, a pair of longitudinally spaced-apart radial hydrodynamic journal bearings defined between the shaft and the sleeve, a shaft-bolt including a threaded end region for mating with the threaded axial opening of the shaft and defining a bolt shoulder, an annular thrust plate having two parallel radial faces and adapted to fit upon the shaft-bolt for mounting between the shaft shoulder and the shaft bolt shoulder when the shaft-bolt is mated with the threaded axial opening of the shaft, the sleeve defining a radial thrust bearing surface portion extending radially outwardly at one end and positioned to confront one radial face of the thrust plate, an annular thrust bushing mounted to the sleeve and defining a radial thrust bearing surface portion confronting the other radial face of the thrust plate, the annular thrust plate defining two axial hydrodynamic thrust bearings respectively with the radial thrust bearing surface portion of the sleeve and the radial thrust bearing surface portion of the annular thrust bushing and a hydrodynamic thrust bearing lubricant reservoir between the two axial hydrodynamic thrust bearings and between a cylindrical face of the thrust plate and a facing cylindrical wall of the sleeve, and a hydrodynamic bearing lubricant in the bearing unit and at the pair of hydrodynamic journal bearings and at the two axial hydrodynamic thrust bearings and in the hydrodynamic bearing lubricant reservoir.

Capillary seals at diameters outside of the diameter of the shaft-sleeve radial journal bearings, and hydrodynamic lubricant recirculation paths for the hydrodynamic radial bearings and the two hydrodynamic thrust bearings are also aspects of the present invention.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF THE PREFERRED EMBODIMENTS

Figure 2:
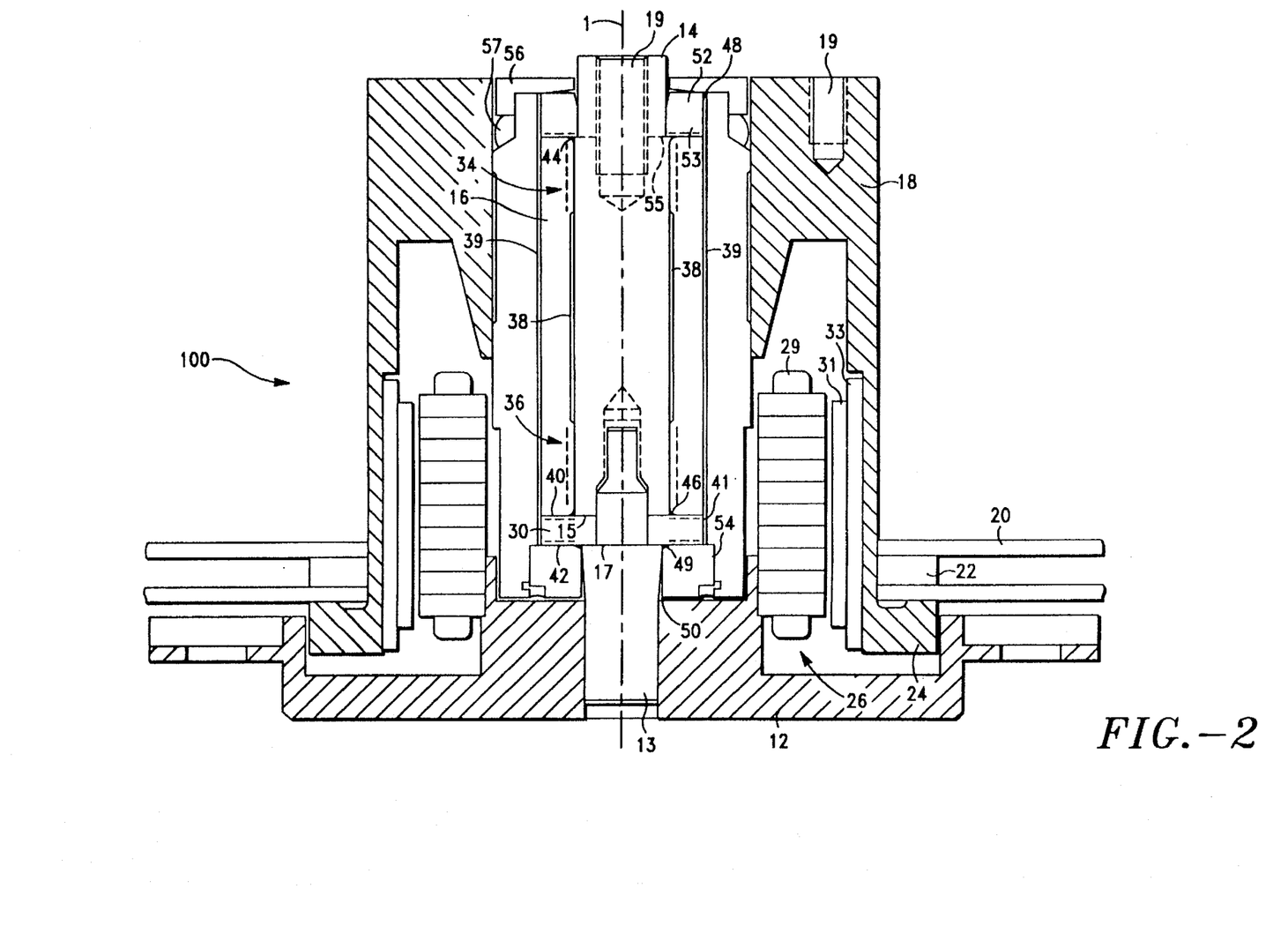
FIG. 2 is an enlarged view in elevation and section of a single thrust, single seal plate, thrust down HDB spindle unit in accordance with principles of the present invention.

Turning to FIG. 2, a single thrust, single seal plate, thrust down HDB spindle unit 100 incorporating principles of the present invention includes a base 12, and a lower shaft-bolt 13 having a threaded stud portion 21 for mating with a threaded opening 23 of a central shaft 14 for securing the central shaft 14 to the base. The shaft 14 is concentric about a longitudinal axis 1 of symmetry-rotation. The shaft 14 defines a threaded axial opening 19 at the top for receiving a screw (not shown) for securing the shaft 14 to a top cover to provide structural rigidity to the spindle unit 100. A bronze sleeve 16 fits over the shaft with a close clearance tolerance and defines two axially spaced apart hydrodynamic journal bearings 34 and 36 by virtue of pumping grooves suitably defined in the sleeve (or shaft) at the bearing regions. A spindle hub 18 is secured to the sleeve 16. An upper radial wall of the hub 18 defines a series of threaded bores 19 for receiving screws for securing a clamp (not shown) for securely clamping a stack of disks 20 and spacers 22 to a lower flange 24 of the hub. A DC brushless in-hub spindle motor 26 includes a fixed stator assembly 29 with slots facing alternating magnet pole faces of a permanent magnet 31 secured to an annular flux return ring 33, in turn secured to an inside cylindrical wall of the hub 18 in conventional fashion. Driving currents selectively applied to various coils of the stator assembly induce reaction forces in the permanent magnet, and rotation of the sleeve 16 and hub 18 ensues. As thus far described, the spindle unit 100 is a top-fixed or cantilevered spindle design manifesting high inertial loading.

A "thrust-down" annular thrust plate 30 e.g. of steel alloy is guided onto the lower shaft-bolt 13 in a close-tolerance slip-fit arrangement. A lower radial wall 15 of the shaft 14 establishes perpendicularity of the thrust plate 30 relative to the axis 1, and a shoulder 17 formed as a base of a conical portion of the shaft-bolt 13 applies a securing force to secure the thrust plate 30 in place against the wall 15 when the shaft-bolt 13 is tightened. An e.g. bronze thrust bushing 54 is secured to an inner annular recess of the sleeve 16, and sandwiches the thrust plate 30 in a precision hydrodynamic bearing relationship between a lower radial face of the sleeve 16 and an upper radial face of the thrust plate 30. Pumping grooves defined on the thrust plate 30 or on the upper and lower radial faces of the sleeve 16 and thrust bushing 54 respectively define upper and lower hydrodynamic axial thrust bearings 40 and 42 with typical nominal clearances of approximately 10 microns.

An upper seal plate 52 is press-fit onto the shaft 14 until a shoulder 55 is reached which aligns the seal plate 52 precisely with regard to an upper radial wall of the sleeve 16. The seal plate 52 functions to provide an upper radial seal for lubricant and extend the seal to a location radially outwardly of the inside diameter of the shaft-sleeve journal diameter in order to reduce loss of lubricant otherwise resulting from centrifugal force during operation of the bearing unit 100. Since the seal plate 52 functions merely as a seal, and not as an upper thrust bearing as shown in the FIG. 1 example, a much greater clearance, such as 50–100 microns, may be provided between the seal plate 52 and the upper radial face of the sleeve 16. Sealing grooves 53 may be defined in one or both of the opposite faces of the seal plate 52 and the upper radial face of the sleeve 16 to oppose lubricant displacement otherwise induced by centrifugal force during bearing unit operation. The seal plate 52 forms an upper annular capillary seal 48 which is radially outside of the shaft-sleeve interface defining the journal bearings 34 and 36 to reduce lubricant losses from centrifugal forces as noted above. A containment ring 56 forms an upper, secondary lubricant containment capillary 58 with an upper face of the seal plate 52 which may extend the upper capillary seal 48 or may exist in addition thereto. The containment ring 56 is secured to an annular end portion of the sleeve 16 by a suitable adhesive 57. Facing surfaces of the containment ring 56 and the seal plate 52 may be coated with a suitable thin film barrier material for impeding surface flow of the lubricating liquid droplets out of the containment capillary 58.

As shown, the top-fixed spindle unit 100 provides lubricant recirculation paths between the journal bearings 34 and 36 by virtue of an inside annular passageway 38 next to the shaft 14, and one or more radially outward longitudinal bores 39 which are in substantial radial alignment with the upper annular capillary seal 48 and a reservoir 41 just beyond an outer cylindrical wall of the thrust plate 30. The reservoir 41 also feeds and buffers lubricant to and from the HDB thrust bearings 40 and 42. Upper and lower chamfers defined at inside corners of the sleeve 16 adjacent to the shaft 14 provide additional storage reservoirs 44 and 46 for the hydrodynamic fluid lubricant. A lower annular reservoir 49 is positioned between the lower thrust bearing 42 and a lower annular capillary seal 50. The narrow (e.g ½ millimeter diameter longitudinal bores through the sleeve 16 are preferably defined by wire electro-discharge machining (EDM) techniques.

Figure 3:
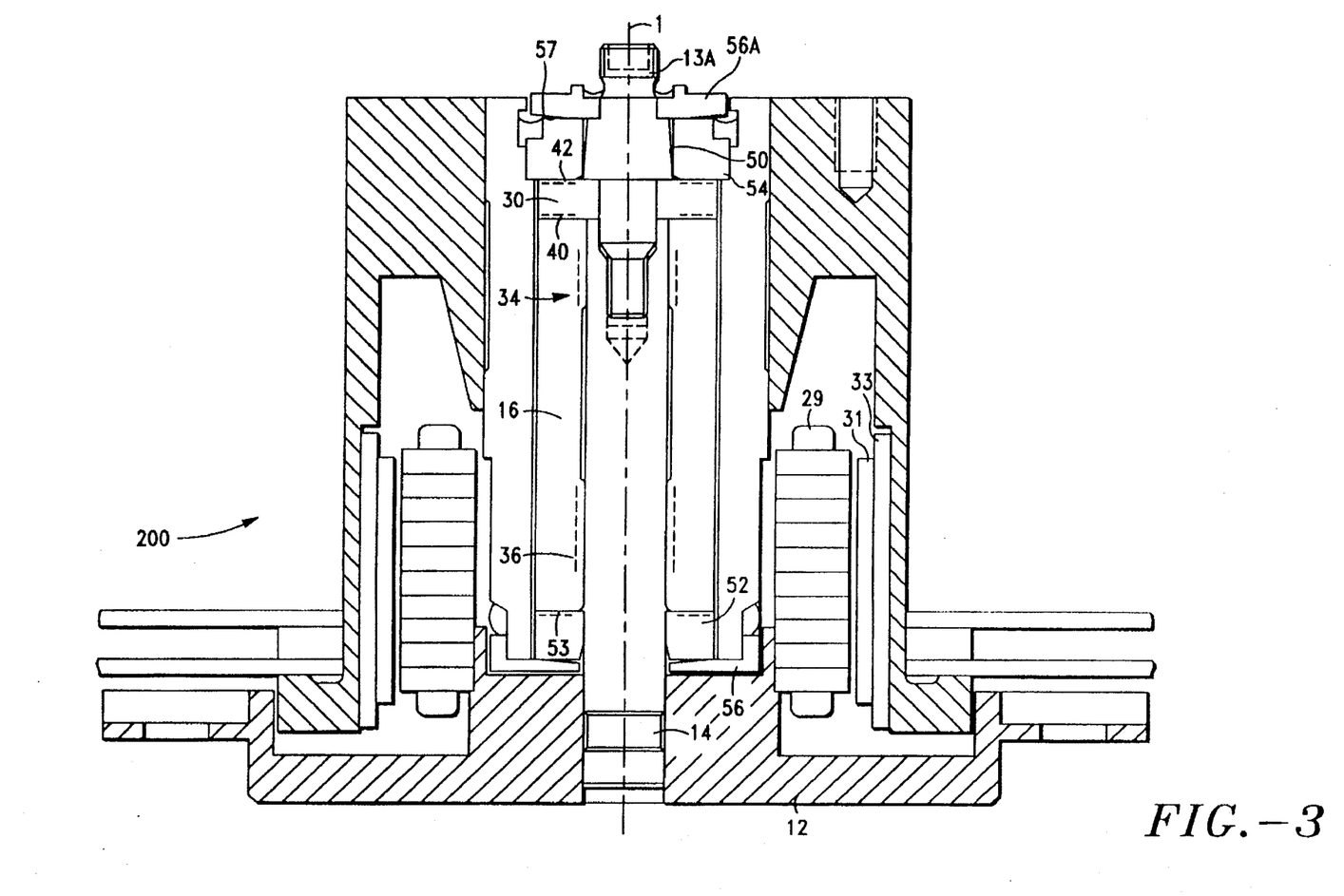
FIG. 3 is an enlarged view in elevation and section of a single thrust, single seal plate, thrust up HDB spindle unit in accordance with principles of the present invention.

FIG. 3 presents an alternative spindle unit 200 in which the thrust plate 30 is secured to the top of the shaft 14 by an upper threaded shaft-bolt 13A which includes a threaded boss for receiving a nut securing a cover onto the shaft shaft-bolt 13A and in turn securing the shaft 14. In FIG. 3, the elements of the FIG. 2 embodiment associated with the thrust plate have been moved to the top of the unit 200, while the elements of the FIG. 2 embodiment at the top of the shaft 14, have been displaced to the bottom, without changing the reference numerals for these elements between the two figures. In FIG. 3, the threaded shaft-bolt 13A also secures an upper containment ring 56A. A secondary lubricant containment seal 57 is formed between the upper containment ring 56A and the upper thrust bushing 54 in order to reduce the likelihood of lubricant leakage from the top seal. Otherwise, the units 100 and 200 are structurally and functionally equivalent.

While overcoming many of the problems of the prior single and double thrust plate designs discussed in the background of the invention, there remain two drawbacks with the FIGS. 2 and 3 embodiments. First, there are no lubricant recirculation ports around one of the two thrust bearings for facilitating lubricant recirculation and pressure equilibrium. Second, one capillary seal 50 is at the bearing unit inside diameter (i.e. shaft-sleeve HDB journal bearing interface).

Figure 4:
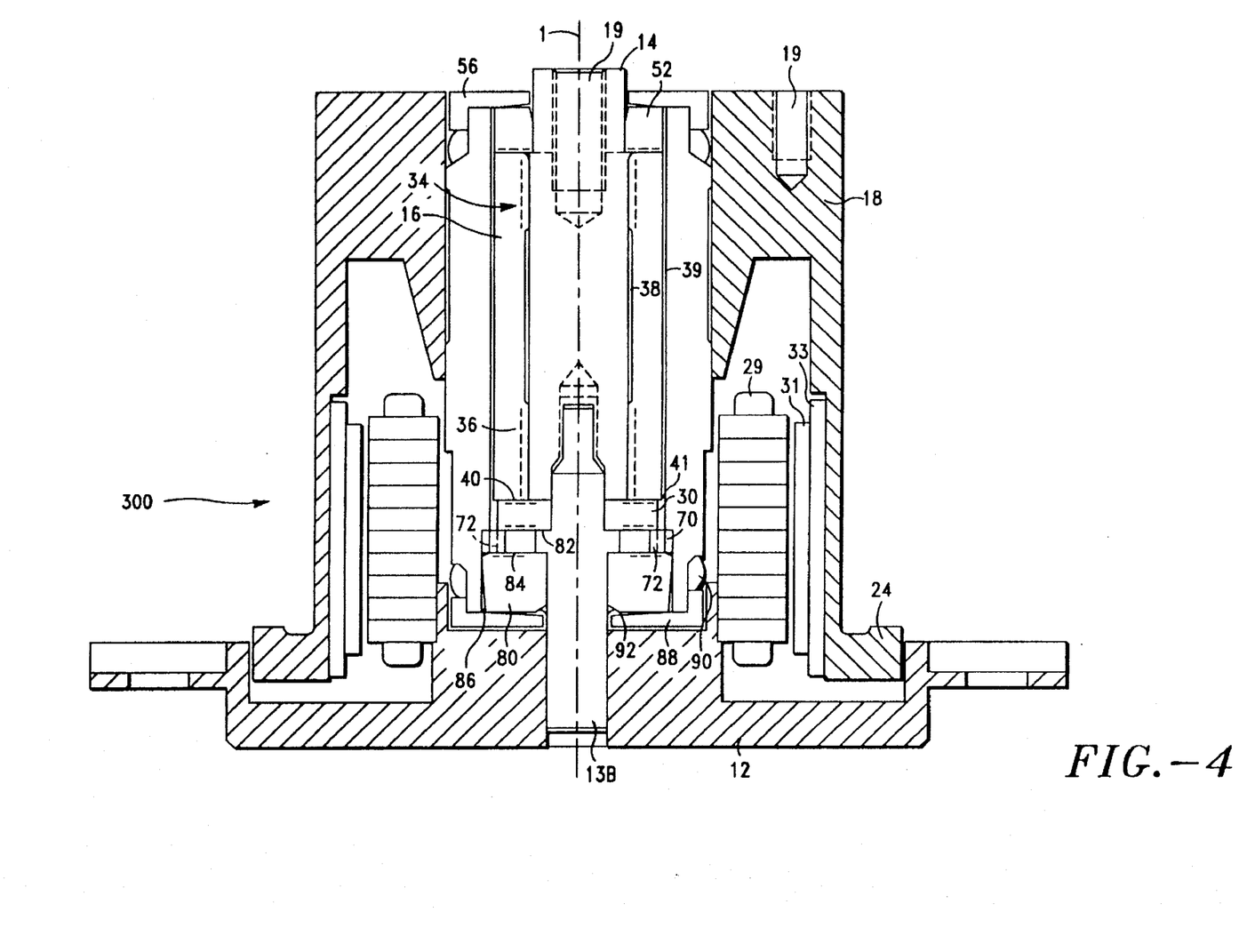
FIG. 4 is an enlarged view in elevation and section of a single thrust plate down, double seal plate HDB spindle unit in accordance with the principles of the present invention.
Figure 5:
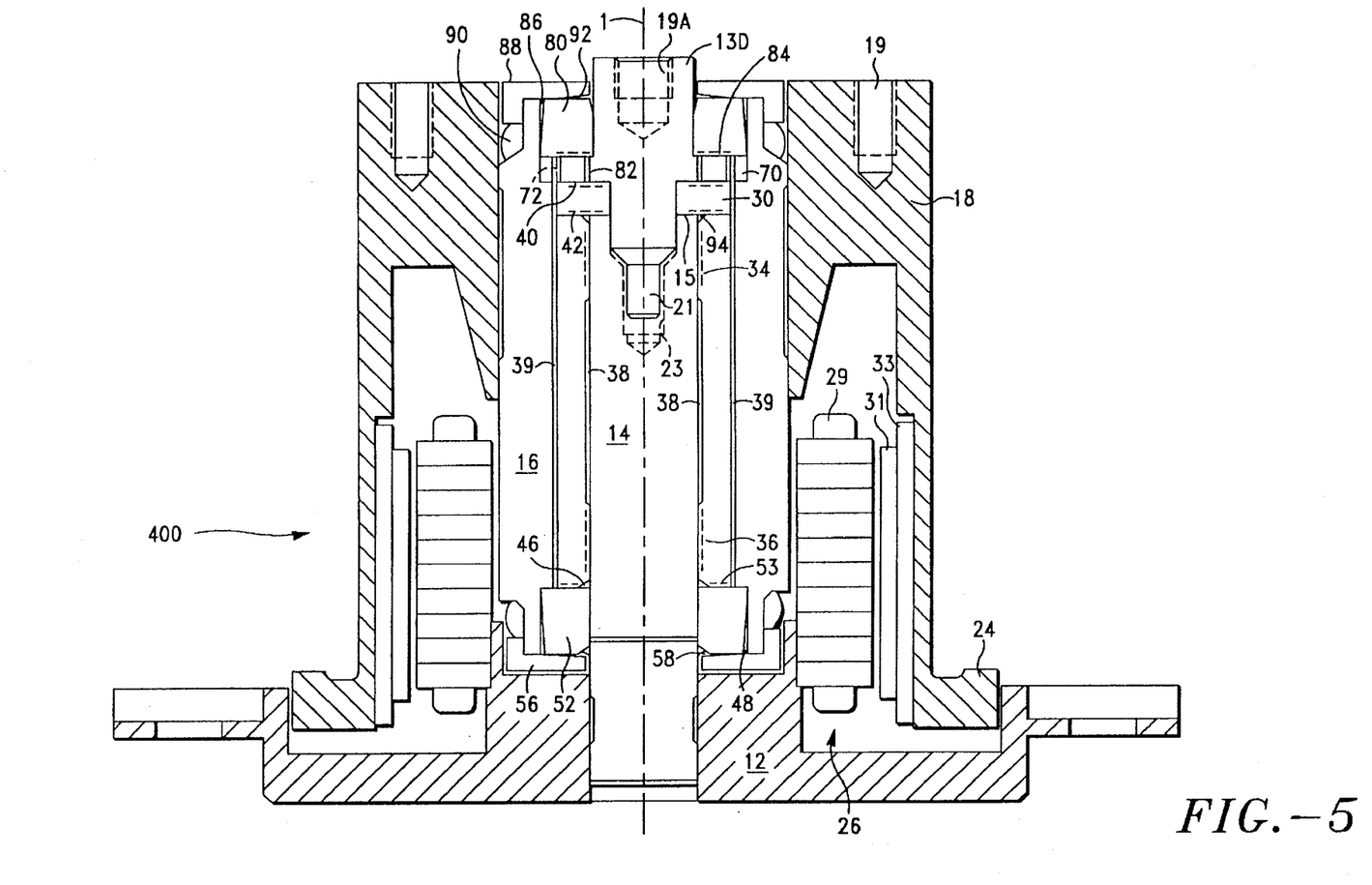
FIG. 5 is an enlarged view in elevation and section of a single thrust plate up, double seal plate HDB spindle unit in accordance with principles of the present invention.

These remaining drawbacks are overcome within the embodiments of FIGS. 4 and 5. In FIG. 4 a single down thrust plate, double seal HDB spindle unit 300 follows in many important respects the spindle unit 100 discussed above in conjunction with FIG. 2. There are several important differences with regard to the thrust plate 30. In the FIG. 4 spindle unit 300 the single thrust plate 30 is fixed onto the shaft 14 by the threaded shaft-bolt 13B. The thrust plate 30 provides HDB thrust bearings 40 and 42, except that in this embodiment 300, a thrust bushing 70 is provided which is secured e.g. by press-fitting into an inner cylindrical recess of the sleeve 16 and rotates with it. The lower thrust bearing 42 is formed at a top radial wall of the thrust bushing 70 and the lower radial wall of the thrust plate 30. One or several lubricant recirculation ports 72 are defined through the thrust bushing 70 to enable recirculation of hydrodynamic lubricating liquid. A bottom seal plate 80 is also press-fit onto the threaded shaft-bolt 13B. The shaft-bolt 13B defines an annular boss 82 which enables precise positioning of the thrust plate 30 and bottom seal plate 80 relative to the thrust bushing 70. Pumping grooves 84 may be defined between the lower radial face of the thrust bushing 70 and the bottom seal plate 80 to neutralize radial pumping action otherwise attributable to relative rotation and centrifugal forces. A radially outer annular capillary seal 86 is defined between an inside wall of the sleeve 16 and an outer tapered face of the bottom seal plate 80. A bottom lubricant containment ring 88 includes an upturned flange which is secured to an outer cylindrical region of the sleeve 16 by a suitable adhesive 90. The containment ring 88 cooperates with a bottom radial wall of the bottom seal plate 80 to define a secondary capillary seal-lubricant trap 92.

FIG. 5 presents an alternative HDB spindle unit 400 which modifies the FIG. 4 embodiment 300 by placing the single thrust plate 30 at the top of the shaft 14. A shaft-bolt 13D provides a widened threaded opening 19A enabling the cover (not shown) to be secured to the shaft-bolt 13D without disturbing its relative alignment with the shaft 14, and sleeve 16. Otherwise, the description given above for the FIG. 4 embodiment 300 applies to the embodiment 400 of FIG. 5.

The embodiments 300 and 400 of FIGS. 4 and 5 respectively overcome essentially all of the problems mentioned above for the prior designs, and improve somewhat upon the embodiments of FIGS. 2 and 3. The thrust bearing clearance is controlled by the thickness of the thrust plate 30 and the height between the facing radial shoulder of the sleeve 16 and the step of the sleeve above the thrust plate for receiving the thrust bushing 70, whose dimensional tolerances are easier to control in manufacturing. Selective assembly may also be employed to control further the thrust bearing clearances. Press fitting of the thrust bearing 30 relative to the sleeve 16 is avoided in these FIGS. 4 and 5 embodiments 300 and 400. Recirculation ports 39 and 72 facilitate recirculation of hydrodynamic lubricant around the journal bearings 34 and 36, and around the thrust bearings 40 and 42. Both the outer axial capillary seals 48 and 86 are at an outer diameter of the bearing unit 300, 400 and are generally aligned with the passages 39 and 72.

Furthermore, the FIG. 5 embodiment 400 further reduces wear of the sleeve 16 if the thrust bushing 70 is made of stainless steel and the spindle unit 400 is mounted for the most part in the up-down orientation given it in the FIG. 5 view. Tolerance of the total length of the sleeve 16 is relaxed because of relatively large allowable clearance (e.g. 50–100 microns) between the seal plate 52 and the sleeve 16. Only the radial face of the sleeve 16 directly facing the thrust plate 30 needs to be provided with a tightly controlled surface finish and maintain close perpendicularity tolerances. Thus, the embodiments 300 and 400 of FIGS. 4 and 5 maintain all of the advantageous lubricant seal arrangements found in the prior double-thrust plate design 10 described in connection with FIG. 1 without having the same drawbacks and manufacturing difficulties.

As used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures and should not be construed as limiting.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A self-contained hydrodynamic bearing unit comprising:
    a shaft defining a threaded axial opening at one end thereof and a shaft shoulder adjacent the opening and perpendicular with a longitudinal axis of the shaft,
    a sleeve defining an opening for receiving the shaft for relative rotation,
    a pair of longitudinally spaced-apart radial hydrodynamic journal bearings defined between the shaft and the sleeve,
    a shaft-bolt including a threaded end region for mating with the threaded axial opening of the shaft and defining a bolt shoulder,
    an annular thrust plate having two parallel radial faces and adapted to fit upon the shaft-bolt for mounting between the shaft shoulder and the shaft bolt shoulder when the shaft-bolt is mated with the threaded axial opening of the shaft,
    the sleeve defining a radial thrust bearing surface portion extending radially outwardly at one end and positioned to confront one radial face of the thrust plate,
    an annular thrust bushing mounted to the sleeve and defining a radial thrust bearing surface portion confronting the other radial face of the thrust plate,
    the annular thrust plate defining two axial hydrodynamic thrust bearings respectively with the radial thrust bearing surface portion of the sleeve and the radial thrust bearing surface portion of the annular thrust bushing and a hydrodynamic thrust bearing lubricant reservoir between the two axial hydrodynamic thrust bearings and between a cylindrical face of the thrust plate and a facing cylindrical wall of the sleeve,
    hydrodynamic bearing lubricant in the bearing unit and at the pair of hydrodynamic journal bearings and at the two axial hydrodynamic thrust bearings and in the hydrodynamic bearing lubricant reservoir.

2. The self-contained hydrodynamic bearing unit set forth in claim 1 further comprising an annular seal plate secured to the shaft at an end region of the shaft opposite an end mounting the thrust plate, the annular seal plate defining an annular capillary seal for containing the hydrodynamic bearing lubricant at a diameter greater than a diameter of the radial journal bearings defined between the shaft and the sleeve.

3. The self-contained hydrodynamic bearing unit set forth in claim 2 wherein an inner cylindrical wall defined by the sleeve and adjacently facing surface of the annular seal plate define a divergent gap for the annular capillary seal.

4. The self-contained hydrodynamic bearing unit set forth in claim 2 wherein the annular seal plate defines a radial face in confronting relationship with a radial surface portion of the sleeve, and further comprising pumping grooves defined in at least one of the radial face of the annular seal plate and the radial surface portion of the sleeve for pumping the hydrodynamic bearing lubricant toward the shaft to resist centrifugal forces otherwise pumping the hydrodynamic bearing lubricant radially outwardly during relative rotation of the bearing unit.

5. The self-contained hydrodynamic bearing unit set forth in claim 2 further comprising an annular containment ring having a cylindrical outer flange secured to an annular ring of the sleeve and surrounding the annular seal plate, defining a secondary hydrodynamic bearing lubricant containment seal in communication with the annular capillary seal for trapping lubricant otherwise escaping from the annular capillary seal.

6. The self-contained hydrodynamic bearing unit set forth in claim 5 wherein the secondary hydrodynamic bearing lubricant containment seal has surfaces coated with a thin film barrier material for impeding surface flow of droplets of the lubricant.

7. The self-contained hydrodynamic bearing unit set forth in claim 2 further comprising a hydrodynamic bearing lubricant reservoir in an annulus defined between the shaft and sleeve between the pair of radial journal bearings and at least one longitudinal recirculation hole defined in the shaft at a diameter approximately the diameter of the annular capillary seal and extending through the sleeve to a hydrodynamic bearing lubricant reservoir adjacent the thrust plate.

8. The self-contained hydrodynamic bearing unit set forth in claim 1 wherein the annular thrust bushing and the shaft bolt define a divergent gap annular capillary seal for the hydrodynamic bearing lubricant at a diameter approximately at the diameter of the radial journal bearings defined between the shaft and the sleeve.

9. The self-contained hydrodynamic bearing unit set forth in claim 1 further comprising a hydrodynamic bearing lubricant reservoir in an annulus defined between the shaft and sleeve between the pair of radial journal bearings.

10. The self-contained hydrodynamic bearing unit set forth in claim 1 further comprising:
    an annular seal plate secured to the shaft at an end region of the shaft opposite an end mounting the thrust plate, the annular seal plate defining a first annular capillary seal for containing the hydrodynamic bearing lubricant at a diameter greater than a diameter of the radial journal bearings defined between the shaft and the sleeve,
    wherein the annular thrust bushing and the shaft-bolt define a second divergent gap annular capillary seal for the hydrodynamic bearing lubricant at a diameter approximately at the diameter of the radial journal bearings defined between the shaft and the sleeve,
    a hydrodynamic bearing lubricant reservoir in an annulus defined between the shaft and sleeve between the pair of radial journal bearings, and
    at least one longitudinal recirculation hole defined in the shaft at a diameter approximately the diameter of the annular capillary seal and extending through the sleeve to a hydrodynamic bearing lubricant reservoir adjacent the thrust plate.

11. The self-contained hydrodynamic bearing unit set forth in claim 1 further comprising an annular seal plate secured to the shaft-bolt adjacent to the annular thrust bushing, the annular seal plate and an adjacent facing wall segment of the sleeve defining an annular seal at a diameter greater than a diameter of the radial journal bearings defined between the shaft and the sleeve.

12. The self-contained hydrodynamic bearing unit set forth in claim 11 wherein the annular seal plate and the adjacent facing wall segment of the sleeve define the annular seal as a divergent gap annular capillary seal.

13. The self-contained hydrodynamic bearing unit set forth in claim 11 wherein the annular thrust bushing defines at least one hydrodynamic bearing lubricant recirculation port in communication with the hydrodynamic thrust bearing lubricant reservoir for enabling recirculation of hydrodynamic bearing lubricant at the thrust bearings during operation of the bearing unit.

14. The self-contained hydrodynamic bearing unit set forth in claim 1 further comprising a base and a cover, the shaft-bolt being secured to the base, and the shaft being secured to the cover.

15. The self-contained hydrodynamic bearing unit set forth in claim 1 further comprising a base and a cover, the shaft-bolt being secured to the cover, and the shaft being secured to the base.

16. A self-contained hydrodynamic bearing unit comprising:

a shaft defining a threaded axial opening at one end thereof and a shaft shoulder adjacent the opening and perpendicular with a longitudinal axis of the shaft, a sleeve defining an opening for receiving the shaft for relative rotation, a pair of longitudinally spaced-apart radial hydrodynamic journal bearings defined between the shaft and the sleeve, a shaft-bolt including a threaded end region for mating with the threaded axial opening of the shaft and defining a bolt shoulder, an annular thrust plate having two parallel radial faces and adapted to fit upon the shaft-bolt for mounting between the shaft shoulder and the shaft bolt shoulder when the shaft-bolt is mated with the threaded axial opening of the shaft, the sleeve defining a radial thrust bearing surface portion extending radially outwardly at one end and positioned to confront one radial face of the thrust plate, an annular thrust bushing mounted to the sleeve and defining a radial thrust bearing surface portion confronting the other radial face of the thrust plate, the annular thrust plate defining two axial hydrodynamic thrust bearings respectively with the radial thrust bearing surface portion of the sleeve and the radial thrust bearing surface portion of the annular thrust bushing and a hydrodynamic thrust bearing lubricant reservoir between the two axial hydrodynamic thrust bearings and between a cylindrical face of the thrust plate and a facing cylindrical wall of the sleeve, a first annular seal plate secured to the shaft-bolt adjacent to the annular thrust bushing, the annular seal plate and an adjacent facing wall segment of the sleeve defining a first annular seal at a diameter greater than a diameter of the radial journal beatings defined between the shaft and the sleeve, and hydrodynamic bearing lubricant in the bearing unit and at the pair of hydrodynamic journal bearings and at the two axial hydrodynamic thrust bearings and in the hydrodynamic bearing lubricant reservoir.

17. The self-contained hydrodynamic bearing unit set forth in claim 16 further comprising a second annular seal plate secured to the shaft at an end region of the shaft opposite an end mounting the thrust plate, the annular seal plate defining a second annular capillary seal for containing the hydrodynamic bearing lubricant at a diameter greater than a diameter of the radial journal bearings defined between the shaft and the sleeve.

18. The self-contained hydrodynamic bearing unit set forth in claim 16 wherein the annular thrust bushing defines at least one hydrodynamic bearing lubricant recirculation port in communication with the hydrodynamic thrust bearing lubricant reservoir for enabling recirculation of hydrodynamic bearing lubricant at the thrust bearings during operation of the beating unit.

19. The self-contained hydrodynamic bearing unit set forth in claim 18 further comprising a second annular seal plate secured to the shaft at an end region of the shaft opposite an end mounting the thrust plate, the annular seal plate defining a second annular capillary seal for containing the hydrodynamic bearing lubricant at a diameter greater than a diameter of the radial journal bearings defined between the shaft and the sleeve, and a hydrodynamic bearing lubricant reservoir in an annulus defined between the shaft and sleeve between the pair of radial journal bearings and at least one longitudinal recirculation hole defined in the shaft at a diameter approximately the diameter of the second annular capillary seal and extending through the sleeve to the hydrodynamic thrust bearing lubricant reservoir adjacent the thrust plate.

20. A self-contained hydrodynamic bearing unit comprising:

a base, a shaft fixed at one end to the base, and providing a cover attachment means at another end for securing a cover fixed relative to the base, a sleeve having a central opening for receiving the shaft in a rotational relationship, at least one hydrodynamic journal bearing defined between confronting cylindrical walls of the shaft and sleeve, a hydrodynamic lubricant reservoir defined between the shaft and sleeve for providing the journal bearing with a supply of lubricant, a double-faced single thrust plate fixed to the shaft and located at one end of the sleeve, a first hydrodynamic thrust bearing formed at confronting radial faces of the thrust plate and sleeve, the first hydrodynamic thrust bearing communicating with the hydrodynamic lubricant reservoir, a first shaft seal structure having at least one part thereof secured to the shaft and forming a second hydrodynamic bearing at confronting radial faces of the one part and the thrust plate, the second hydrodynamic thrust bearing communicating with the hydrodynamic lubricant reservoir via the first hydrodynamic thrust bearing, the first shaft seal structure forming a first axial capillary seal located between the first shaft seal structure and one of the sleeve and shaft and exteriorly of the second hydrodynamic thrust bearing for sealing hydrodynamic lubricant against escape during relative rotation between the shaft and the sleeve.

21. The self-contained hydrodynamic bearing unit set forth in claim 20 wherein the shaft includes a threaded axial opening and a shaft shoulder, and further comprising a shaft-bolt including a threaded end region for mating with the threaded axial opening and defining a shaft bolt shoulder, the annular thrust plate being mounted between the shaft shoulder and the shaft bolt shoulder.

22. The self-contained hydrodynamic bearing unit set forth in claim 20 wherein the thrust plate and first shaft seal structure are located at an end of the shaft adjacent to the cover attachment means.

23. The self-contained hydrodynamic bearing unit set forth in claim 20 wherein the first shaft seal structure comprises a thrust bushing secured to the sleeve and having a radial face confronting a radial face of the thrust plate thereby forming the second hydrodynamic thrust bearing, and a first seal plate secured to the shaft exteriorly of the thrust plate and thrust bushing, the first seal plate forming the first axial capillary seal at a radius greater than a radius of the hydrodynamic journal bearing.

24. The self-contained hydrodynamic bearing unit set forth in claim 21 wherein the sleeve defines at least one sleeve hydrodynamic lubricant circulation passage axially aligned at an outer radius of the thrust plate for circulating lubricant between the hydrodynamic lubricant reservoir and the first hydrodynamic thrust bearing, and wherein the thrust bushing defines at least one bushing hydrodynamic lubricant circulation passage axially aligned with the sleeve hydrodynamic lubricant circulation passage, for communicating lubricant between the thrust bearing and the first axial capillary seal.

25. The self-contained hydrodynamic bearing unit set forth in claim 21 wherein the first shaft seal structure further includes a first lubricant containment ring secured to the sleeve exteriorly of the first seal plate.

26. The self-contained hydrodynamic bearing unit set forth in claim 25 wherein the first shaft seal structure further includes a radial capillary seal defined between the first lubricant containment ring and the first seal plate and communicating with the axial capillary seal.

27. The self-contained hydrodynamic bearing unit set forth in claim 20 wherein the sleeve defines at least one hydrodynamic lubricant recirculation passage axially aligned at an outer radius of the thrust plate for circulating lubricant between the hydrodynamic lubricant reservoir and the first hydrodynamic thrust bearing.

28. The self-contained hydrodynamic bearing unit set forth in claim 20 further comprising a second shaft seal structure including a second seal plate secured to the shaft at an end opposite to the end of the shaft having the first shaft seal structure, the second shaft seal structure forming a second axial capillary seal located between the second shaft seal structure and the sleeve at a radius greater than a radius of the hydrodynamic journal bearing for sealing hydrodynamic lubricant against escape during relative rotation between the shaft and the sleeve.

29. The self-contained hydrodynamic bearing unit set forth in claim 28 wherein the second shaft seal structure further includes a second lubricant containment ring secured to the sleeve exteriorly of the second seal plate.

30. The self-contained hydrodynamic bearing unit set forth in claim 29 wherein the second shaft seal structure further includes a radial capillary seal defined between the second lubricant containment ring and the second seal plate and communicating with the second axial capillary seal.

* * * * *